United States Patent [19]

Richards et al.

[11] 4,175,230
[45] Nov. 20, 1979

[54] METHOD AND APPARATUS FOR TRANSFERRING CONTROL INFORMATION BETWEEN TWO MEMBERS

[75] Inventors: Gordon S. Richards, Paignton; Peter E. Douglas, Brixham; Alan G. Abraham, Torquay, all of England

[73] Assignee: International Standard Electric Corporation, New York, N.Y.

[21] Appl. No.: 899,927

[22] Filed: Apr. 26, 1978

[30] Foreign Application Priority Data

May 5, 1977 [GB] United Kingdom ............... 18868/77

[51] Int. Cl.$^2$ .............................................. H04B 9/00
[52] U.S. Cl. .................................. 250/199; 340/189 M
[58] Field of Search ................... 343/7.6, 7.7; 250/199; 350/96.10, 96.12, 96.13, 96.23, 96.28, 96.33; 358/290, 901; 340/189, 189 M, 190, 201 P

[56] References Cited

U.S. PATENT DOCUMENTS

| 3,816,659 | 6/1974 | Landsman | 358/290 |
| 3,860,747 | 1/1975 | Orii et al. | 358/901 |

FOREIGN PATENT DOCUMENTS 1396865  6/1975  United Kingdom ............ 250/199

*Primary Examiner*—Robert L. Griffin
*Assistant Examiner*—Edward L. Coles
*Attorney, Agent, or Firm*—John T. O'Halloran; Alfred C. Hill

[57] ABSTRACT

There is provided optical arrangements rather than conventional electrical slip rings for transferring control information between two members, one of which is rotatable relative to the other. The information may be transferred by a laser beam which is pulse modulated. The use of an optical method overcomes the disadvantages associated with electrical slip rings, for example, poor contact, unreliability, electromagnetic interference and mechanical complexity.

16 Claims, 9 Drawing Figures

METHOD AND APPARATUS FOR TRANSFERRING CONTROL INFORMATION BETWEEN TWO MEMBERS

BACKGROUND OF THE INVENTION

The present invention relates to the transfer of information between two members, one of which is rotatable relative to the other, i.e. across a continuously rotatable interface.

Information, such as control information, needs to be transferred between fixed and rotatable members, for example, the cupola of an armoured fighting vehicle, or other rotating machinery where direct transfer is not possible, such as in radar systems.

Hitherto, electrical slip rings have been used to transfer the information between the two members, but with them are associated the problems of poor contact, unreliability, electromagnetic interference, mechanical complexity, and if the transfer of electrical power is concerned, differences in d.c. (direct current) voltage levels.

SUMMARY OF THE INVENTION

It is an object of the present invention to provide alternative methods of transferring information between fixed and rotatable members.

A feature of the present invention is the provision of a method of transferring information between two members one of which rotates relative to the other comprising the steps of modulating a beam of radiation with the information to be transferred; launching the beam from one of the members; constraining the beam to travel along a path extending between the two members; and detecting the beam on the other of the members.

Another feature of the present invention is the provision of apparatus for transmitting information beween two members one of which rotates relative to the other comprising: first means fastened to one of the members for launching a beam of radiation modulated by the information; second means fastened to the other of the members for detecting the beam; and third means for constraining the beam to travel along a path extending between the members.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

The present invention utilizes optical means to achieve the information transfer.

Figure 1:
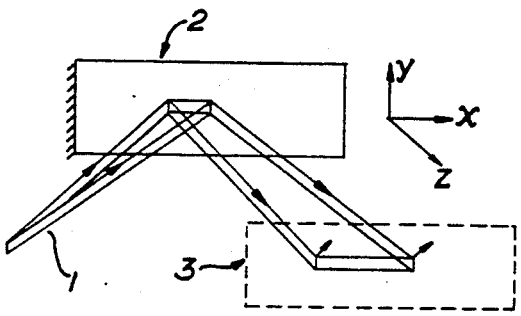
FIG. 1 shows schematically a pair of plane mirrors and illustrates a basic principle behind one embodiment in accordance with the principles of the present invention.

Referring to FIG. 1, if a wedge-shaped beam of radiation 1, which is in a plane parallel to the x z plane, is incident on and reflected from a plane mirror 2, which is in a plane parallel to the x y plane, it will be constrained to remain in the plane parallel to the xz plane but will be diverged along the x-direction. A further plane mirror 3 is arranged parallel with mirror 2 as shown but displaced with respect thereto in the x-direction, and the reflecting surfaces of the mirrors 2 and 3 face one another. Reflection by the plane mirror 3 increases the divergence produced by the mirror 2, and after a few such reflections a "strip" of light in the x-direction will be formed at a mirror surface. If then two continuous parallel mirrors are employed the radiation may be admitted through a slot in one mirror, the length of the slot being in the y-direction, and constrained and transmitted by multiple reflection along the x-direction, with no divergence in the y-direction, and made to emerge from a slot in the other mirror to strike a detector.

Figure 2:
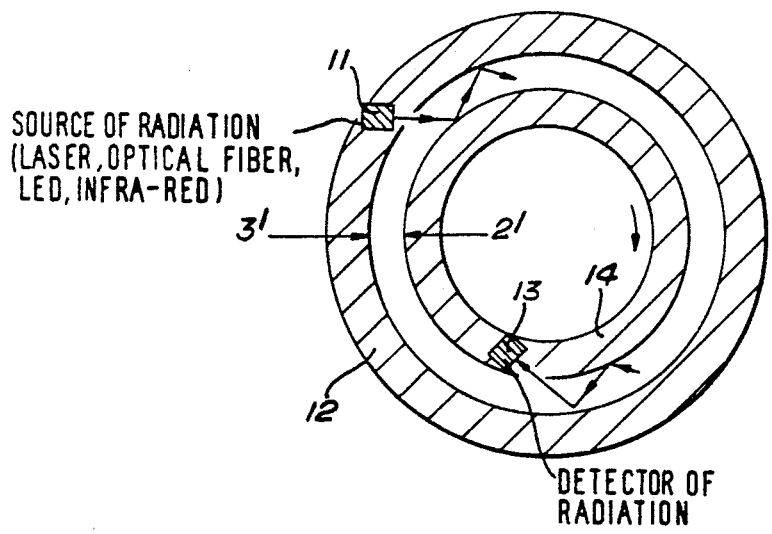
FIG. 2 shows schematically one embodiment in accordance with the principles of the present invention applied to rotatable cupola arrangements.

If the mirrors are curved as shown in FIG. 2, i.e. cylindrical, with mirror 2' inside and rotatable with respect to mirror 3', and a source of radiation 11 is positioned on a stator 12 of a cupola, which stator carries the mirror 3' and a detector of radiation 13 is positioned on a rotator 14, of the cupola, which carries the mirror 2', then transfer of radiation from the source 11 to the detector 13 may be achieved irrespective of the relative position of the stator 12 and the rotator 14 by virtue of the multiple reflection described above. In an alternative arrangement the mirror 3' could be arranged to rotate about mirror 2' and the source and detector interchanged. The information is transmitted between the stator and rotator in the form of the radiation beam.

It would be possible to direct the source 11 radially onto a beam splitter in the annular gap between mirror 2' and 3' so that the beam is split to travel both clockwise and anticlockwise.

In this instance a signal reaching the detector is made up of two components neither of which travels more than half the circumference and the combined detector signal is maintained approximately constant irrespective of the detector position relative to the source.

Figure 3:
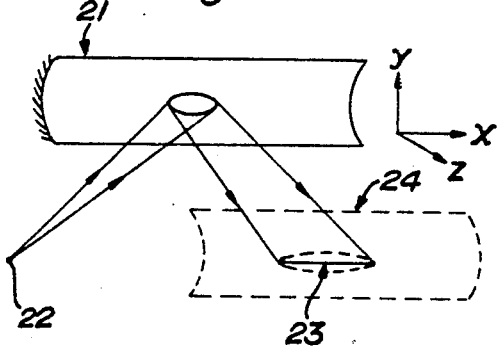
FIG. 3 shows, schematically, a pair of mirrors, which are concave as shown and may be used to perform the present invention.

Alternatively, as shown in FIG. 3, the plane mirror 2 of FIG. 1 may be replaced by a mirror 21 which is curved (concave) in the yz plane. If a cone of radiation, originating from a point 22 on the axis of curvature of the mirror 21 (FIG. 4) and directed such that it is not normal to the xy plane, is incident on the mirror 21 it will be brought to a focus as a line image 23 along the axis of curvature of mirror 21. That is, the beam will be transmitted in the x-direction but constrained in the y-direction. In practice aberrations will be present and the image will tend to be elliptical rather than a line image.

If a second similar curved mirror 24 is placed such that its axis of curvature 25 (FIG. 5) coincides with the principle axis of mirror 21, in which case the axis of curvature of mirror 21 will coincide with the principle axis of mirror 24, then the reflection process will be repeated as described above for plane mirrors. As described with reference to FIG. 2, such concave mirrors may be curved, so that each is continuous, and arranged one "within" the other, with one rotatable with respect to the other, so that the transfer of radiation may be obtained irrespective of their relative positions.

Figure 4:
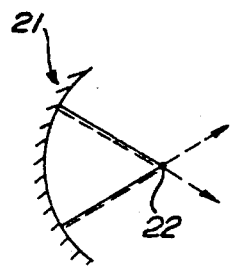
FIG. 4 shows a side view of one of the mirrors of FIG. 3.
Figure 5:
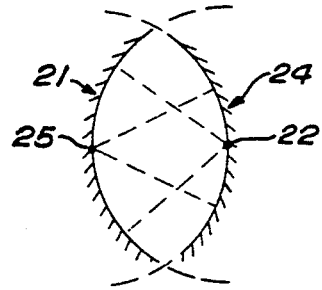
FIG. 5 shows a side view of the pair of mirrors of FIG. 3.
Figure 6:
FIG. 6 shows an alternative arrangement of a pair of mirrors which are concave in cross-section.
Figure 7:
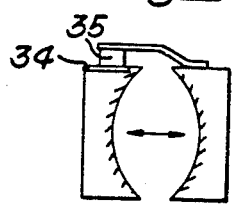
FIG. 7 shows a section through a pair of mirrors and illustrate means for electrical power feeding across the interface between them.

In a modification of the embodiment shown in FIGS. 3 to 5, two such concave mirrors 31 and 32 could alternatively be positioned with respect to one another as shown in the cross-section of FIG. 6, i.e. with a split circular cross-section 33 being the axis of curvature for both mirrors. This arrangement does not have the constraining action associated with the previously described arrangements and consequently will be subject to greater losses, although it will be less critical in adjustment.

For the embodiments of the invention described with respect to FIGS. 1 to 6, concentricity of the stator and rotator portions may be maintained by use of appropriate bearings outside the optical path. The mirrors (reflectors) may be of any suitable material, provided the surface provides adequate reflection of the radiation used, for example, metal or metallized plastic. Transfer of electrical power may be achieved using a conducting ring 34 on one mirror carrier and brushes, such as 35, attached electrically to the other mirror carrier, the arrows indicating the optical path.

The above described embodiments are concerned with arrangements in which the members between which the information is to be transferred both have circular circumferences and one is positioned "within" the other, one of the members being rotatable with respect to the other. Other arrangements in which transfer of information between two members, one of which is rotatable with respect to the other, are possible.

Figure 8:
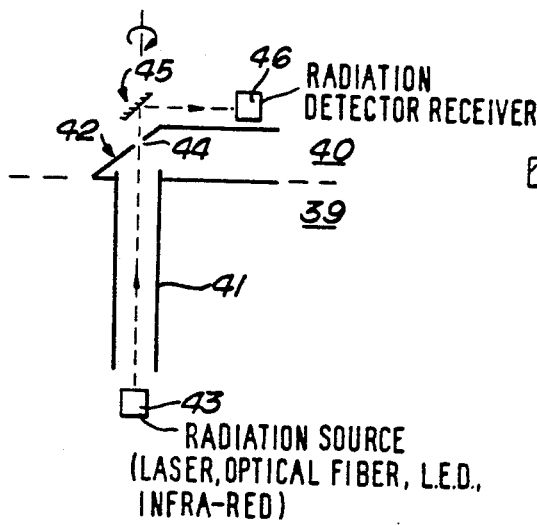
FIG. 8 shows, schematically, another embodiment in accordance with the principles of the present invention applied to a radar system.

FIG. 8 shows schematically a radar system in which microwave power is transmitted via a waveguide 41 in a stationary section 39 of the system to a rotating section 40, the antenna. The waveguide 41 is on the axis of rotation of the antenna and microwave power is transmitted via a waveguide joint 42. Conventionally other control information is transmitted via electrical slip rings. In the embodiment shown in FIG. 8 the control information is transmitted in the form of an optical or infra-red (I.R.) beam on the axis of the rotating antenna through the waveguide 41 from a source 43. A small hole 44 is provided in the waveguide joint 42 so that the beam emerges from the waveguide system and may be directed by a mirror or prism 45 to a radiation detector receiver 46 carried on the rotating antenna. The mirror 45 is mounted so that it rotates with the antenna.

Figure 9:
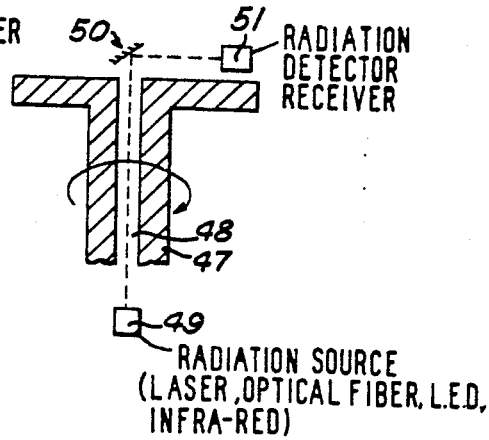
FIG. 9 shows, schematically, a further embodiment in accordance with the principles of the present invention applied to a rotatable axle.

The basic arrangement of FIG. 8 may be used for the transmission of radiation through any axle. In FIG. 9 an axle 47 has a free space channel 48 provided on its axis through which an optical or I.R. beam from a source 49 on the rotor may be directed. A mirror 50 (not-rotatable) directs the beam to a radiation detector receiver 51 which is also non-rotating. Alternatively mirror 50 and detector 51 may be rotatable and source 49 fixed.

For all the embodiments described above a GaAs laser provides an ideal optical beam source, because of the ease with which it may be modulated, although other optical sources such as LED's or the output from an optical fiber, with optics if required to shape the beam, may be used. For the embodiments of FIGS. 8 and 9, the beam can be focussed by optical means so that a parallel beam on the axis is provided, or use may be made of reflection from the internal faces of the waveguide or axle channel, the latter introducing more loss. The detector receiver may be any suitable photodetector, or the input to an optical fiber, again with suitable optics if required. The information is carried by modulation of the radiation beam, for example, pulse modulation. Multiplexing techniques may be used for a plurality of signals to be transmitted simultaneously. Two-way transfer of information between the members may be achieved by using sources of different wavelengths, for example GaAs double heterojunction lasers of 820 and 870 nm, and corresponding bandpass optical filters associated with the detectors.

While we have described above the principles of our invention in connection with specific apparatus it is to be clearly understood that this description is made only by way of example and not as a limitation to the scope of our invention as set forth in the objects thereof and in the accompanying claims.

We claim:

1. Apparatus for transmitting information between two members one of which rotates relative to the other comprising:
    first means fastened to one of said members for launching a beam of radiation modulated by said information;
    second means fastened to the other of said members for detecting said beam; and
    third means for constraining said beam to travel along a path extending between said members;
    said two members including
        a first element having an internal circular circumference,
        a second element having an external circular circumference smaller than said internal circular circumference, said second element being disposed within said first element with a gap therebetween, said information being transferred across said gap for any relative rotational position of said first and second elements, and
        a reflector for said beam provided on each of said circular circumference;
    said first means directs said beam through an aperture in said reflector on said first element into said gap, said beam passing around said gap by multiple reflections from said reflectors on said first and second elements until said beam reaches an aperture in said reflector on said second element through which said beam passes to said second means.

2. Apparatus according to claim 1, wherein said beam is produced by a laser.

3. Apparatus according to claim 1, wherein said beam is launched from an optical fiber.

4. Apparatus according to claim 1, wherein said beam is produced by a light emitting diode.

5. Apparatus according to claim 1, wherein said beam is an infra-red beam.

6. Apparatus according to claim 1, wherein said beam is modulated by pulse modulation techniques.

7. Apparatus according to claim 1, wherein
said reflectors are such as to constrain said beam in all directions other than circumferential around said gap.

8. Apparatus according to claim 7, wherein
said reflectors are cylindrical with their respective reflecting surfaces parallel.

9. Apparatus according to claim 7, wherein
said reflectors are of concave cross-section.

10. Apparatus according to claim 9, wherein
an axis of curvature of one of said reflectors coincides with an axis of curvature of the other of said reflectors.

11. Apparatus for transmitting information between two members one of which rotates relative to the other comprising:
first means fastened to one of said members for launching a beam of radiation modulated by said information;
second means fastened to the other of said members for detecting said beam; and
third means for constraining said beam to travel along a path extending between said members;
said two members including
a non-rotatable section of waveguide, and
a rotatable section of waveguide; and
said beam passes through said non-rotatable section of waveguide, used for microwave power supply to said rotatable section of waveguide, and through an aperture at the junction of said non-rotatable section of waveguide and said rotatable section of waveguide to a rotatable reflector which directs said beam to a detector mounted on said rotatable section of waveguide.

12. Apparatus according to claim 11, wherein
said beam is produced by a laser.

13. Apparatus according to claim 11, wherein
said beam is launched from an optical fiber.

14. Apparatus according to claim 11, wherein
said beam is produced by a light emitting diode.

15. Apparatus according to claim 11, wherein
said beam is an infra-red beam.

16. Apparatus according to claim 11, wherein
said beam is modulated by pulse modulation techniques.

* * * * *